United States Patent [19]
Watanabe

[11] Patent Number: 5,486,744
[45] Date of Patent: Jan. 23, 1996

[54] SERVO DEVICE FOR SPINDLE MOTOR

[75] Inventor: Yusuke Watanabe, Isehara, Japan

[73] Assignee: Ricoh Company, Ltd., Tokyo, Japan

[21] Appl. No.: 18,926

[22] Filed: Feb. 16, 1993

[30] Foreign Application Priority Data

Feb. 20, 1992 [JP] Japan ..................... 4-070150

[51] Int. Cl.⁶ .............................. G11B 19/247
[52] U.S. Cl. ..................... 318/560; 318/561; 318/600; 318/603
[58] Field of Search ................. 318/560–646, 318/138, 254; 388/800–890; 360/720–728

[56] References Cited

U.S. PATENT DOCUMENTS

| | | | |
|---|---|---|---|
| 3,932,794 | 1/1976 | Iwako | 318/560 |
| 4,201,911 | 5/1980 | Dering | 250/231 SE |
| 4,465,977 | 8/1984 | Lopez | 328/120 |
| 4,485,337 | 11/1984 | Sandusky | 318/314 |
| 4,868,385 | 9/1989 | Nishimura | 250/231 SE |
| 4,879,502 | 11/1989 | Endo et al. | 318/723 |
| 4,879,672 | 11/1989 | Pombrio | 364/566 |
| 4,929,894 | 5/1990 | Monett | 360/31 X |
| 4,942,609 | 7/1990 | Meyer | 360/25 |
| 5,097,192 | 3/1992 | Iijima | 318/712 |
| 5,130,626 | 7/1992 | Kajitani et al | 318/608 |
| 5,148,089 | 9/1992 | Adachi et al. | 318/66 |
| 5,159,254 | 10/1992 | Teshima | 318/611 |
| 5,193,146 | 3/1993 | Kohno | 388/811 |
| 5,304,907 | 4/1994 | Abe et al. | 318/611 |

*Primary Examiner*—Paul Ip
*Attorney, Agent, or Firm*—Cooper & Dunham

[57] ABSTRACT

A servo device for servo controlling a spindle motor according to the invention, comprising: a unit for generating a signal with at least two cycles during one full rotation of a rotator in the spindle motor in accordance with a rotational movement of the rotator; a unit for measuring a time required for each of the two periods; a unit for storing at least two target time corresponding to the two periods respectively; and a speed controlling unit for controlling a rotational speed of the rotator at the basis of the comparison between the respective measured period and the corresponding target period. Therefore, a current error of the measurement of periods are associated with the time of half the period preceding the current period, thereby the detection with the reduced delay can be performed in comparison with the detection at the time of one half rotation.

16 Claims, 12 Drawing Sheets

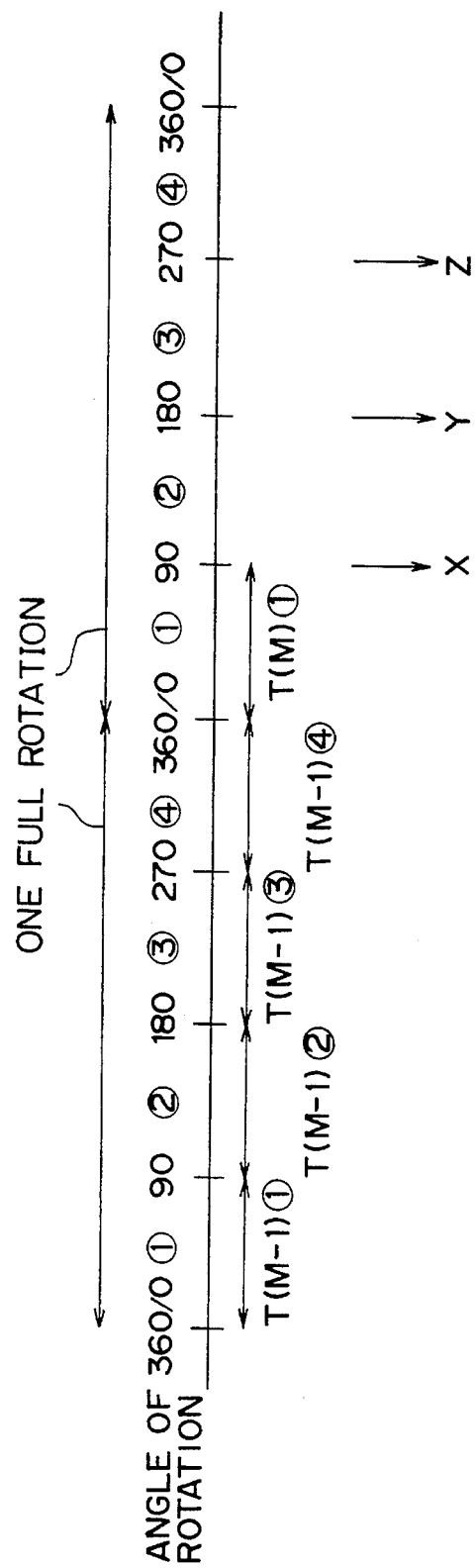
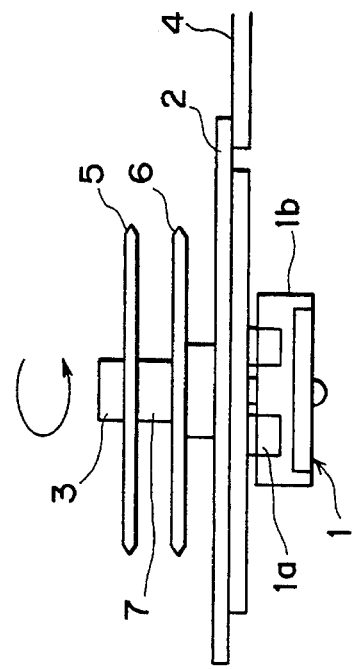

5,486,744

SERVO DEVICE FOR SPINDLE MOTOR

BACKGROUND OF THE INVENTION

1. Field of the Invention

The present invention relates to a servo device for a spindle motor suitable for a recording/reproducing apparatus for recording, reproducing and erasing an information on a magnetic disk, and more particularly to a servo device capable of performing a precise rotational speed control and speed superintendence by eliminating an error which results from a magnetizing state of a magnet which constitutes a rotator of the spindle motor.

2. Description of the Related Art

In general, a spindle motor is used for rotatively deriving a memory carrier of disk type in a magnet disk apparatus.

For example, the number of rotations is from about 2,000 rpm to about 4,000 rpm in the magnetic disk apparatus and a servo mechanism for controlling the rotational speed of the motor is disposed to keep the number of rotations constant.

FIG. 10 shows a side view of main constructional elements around the spindle motor in the magnetic disk apparatus. In the figure, reference numeral 1 denotes the spindle motor; 1a, a stator (field winding); 1b, a rotator; 2, a flange portion; 3, a hub; 4, a deck; 5 and 6, a magnetic disk (a memory carrier); and 7, a spacer.

The spindle motor 1 is fixed on the deck 4 thorough the flange portion 2. The stator 1a composed of the winding is attached in the flange portion 2. The rotator 1b, or the magnet is disposed rotatively opposite to the stator 1.

The magnetic disks 5 and 6 as the memory carrier are disposed separately from each other on the hub 3. The number of poles of the motor is about from two to four sets, where one set is composed of one N pole and one S pole.

In a case that a conventional rotational speed control method is applied to the spindle motor 1, there is a problem of speed control caused by the error associated with the magnetization of the magnet which constitutes the rotator 1b.

FIG. 11 is a plane view showing an example of the magnetizing state of the magnet which constitutes the rotator 1b. In the figure, symbols N and S denote the magnet of the rotator 1b; and $\alpha_1$ and $\alpha_2$, the angular error associated with the magnetization, and the dot line shows the actual magnetizing state.

In an example shown in FIG. 11, four sets of magnet each composed of one N pole and one S pole are arranged. In an ideal case, the magnets are magnetized as illustrated by the real line, however, the angular errors $\alpha_1$ and $\alpha_2$ associated with the magnetization are caused in an actual case because the magnets are magnetized as illustrated by the dot line.

Such a error associated with the magnetization of the rotational magnet of the spindle motor is unavoidable in a manufacturing process.

On the other hand, since the inertia of load is larger in comparison with the torque of the motor in a case of the magnetic disk apparatus, high responsibility is generally not necessary for the servo device for controlling the number of rotations constantly. Therefore, the construction of the servo system can be simplified such that the number of rotations is detected using the detector (for example, a detecting element utilizing Hole effect) for controlling the magnetic pole of the stator (filed winding). In addition, construction elements adapted for high responsibility, for example a sensor for detecting a variation of the magnetic pole of the rotator (magnet), the winding and the like are eliminated. Further, a frequency generator (FG) and the like are not an integral part of the servo system.

FIG. 12 is a plane view illustrating a configuration of Hall-effect elements and the field winding which constitutes the rotator 1a. In the figure, symbols A–C and A'–C' denote the winding; and 8a–8c, the Hall-effect element.

There is provided with three-phase windings A–C and A'–C' in an example shown in FIG. 12. Each pair of the windings A and A', B and B', and C and C' are arranged opposite to each other with respect to the central point. The three hail-effect elements 8a–8c are disposed between the windings A' and B', B' and C', and C' and A respectively to detect the magnetic pole of the rotator.

FIG. 113 shows a timechart diagram representing an example of a timing of exciting the windings of the rotator shown in FIG. 12 and detecting signals generated by the Hall-effect elements. In the figure, symbols Sa–Sc denote the detecting signals of the first to third Hall-effect elements 8a–8c; and A–C denote currents of the three-phase windings.

When the currents flow in the three-phase windings A–C respectively, the motor starts to rotate and the detecting signals Sa–Sc of the Hall-effect elements change as illustrated in the upper part of FIG. 13 according to the rotation of the motor. The timing of currents which are supplied to the windings A–C, that is a exciting pattern is determined in accordance with-states of the detecting signals Sa–Sc of the three Hall-effect elements 8a–8c and the rotational direction. An exciting current is applied to the windings A–C and A'–C' which constitute the rotator according to the exciting pattern.

In a case shown in FIG. 13, the period of each of the detecting signals 8a–8c is equal to the time required foist the rotational angle 90°. That is, if such a simplified detecting means is used, the rotational speed signal is generated according to the number of poles of the rotator (magnet) as shown in FIGS. 12 and 13. Therefore, the signals derived from the detecting means have the same number of periods as the number of sets (poles). The period of the rotational speed signal is in inverse proportion to the rotational speed.

The rotational speed signal includes an error associated with the magnetizing position of the rotator (magnet) as shown in FIG. 11. The quantity of the error is 2°–3° in the unit of angle (one rotation corresponds to the angle 360°) at most. The ratio of the error (the quantity of angle) to the period of the detecting signal increases proportionally according to the number of poles.

FIG. 14 is a timechart diagram representing an example of an one-phase detecting signal detected by a Hall-effect element in the spindle motor including the rotator having an error associated with the magnetization. The horizontal axis represents an angle of rotation, and the vertical axis represents levels of the first to fourth detecting pulses corresponding to the first-fourth cycles respectively.

In an example shown in FIG. 14, a signal with four cycles is detected during one rotation. The sum of the four periods, which are required for the four cycles respectively, is equivalent to the angle of rotation 360° which is constant. However, each of the periods and the ratio of duty are adversely affected by the error. For example, the detecting signal is delayed by the error with respect to the angle 45° during the first cycle corresponding to the first pulse. On the contrary, the detecting signal is put forward with respect to the angle 45° during the second cycle corresponding to the second pulse. Similarly, the detecting signal is delayed or put forward with respect to the angle 90°.

In such a conventional speed controlling system by servomechanism using a rotational speed information having an error, an undesirable quantity of control, which is generated by the error associated with the magnetization, causes a ripple of torque in the motor. The result is that the disadvantage such as a very little variation of the rotational speed during one rotation, abnormal sound and the like are revealed, but the total period for one rotation is constant.

On the other hand, it is; impossible to judge the quality of the rotational speed precisely from only the detection of one period of the above-mentioned rotational speed signal under the requirement of 1 and less % accuracy of the rotational speed, that is 1 and less % of the speed regulation.

Since a precise information with respect to the rotational speed is not obtained by the error associated with the magnetization of the magnet which constitutes the rotator in such a conventional spindle motor mentioned above, a shortcoming takes place that a control with such a high degree of accuracy as the 1 and less percentage of the speed regulation can not be performed.

The inventor proposed a servo device and a rotational speed superintendence device for a spindle motor in which a precise rotational speed control can be performed in spite of the error associated with magnetization of the magnet of the rotator in the document of Japanese Application No. 3-146,678.

In these proposed devices, a time required for one rotation is calculated from a rotational speed signal and a control of the rotational speed is performed according to the difference between the calculated time required for one rotation and a target time required for one rotation when the motor rotates at a target number of rotations. The calculated time represents the mean rotational speed during one rotation at the time just before the calculation. Therefore, to be exact the detection of the speed information is delayed with a time corresponding to a half rotation.

The result is that improvement of the control capacity must be prevented by such a trouble as the delay, which corresponds to a half rotation, of the detection of the speed information if the trouble is not eliminated.

SUMMARY OF THE INVENTION

It is therefore an object of the present invention to provide a servo device for a spindle motor which is free of the aforementioned defects and which performs a precise control with a high degree of control capacity in spite of an error associated with the magnetization of a magnet of a rotator.

It is a further object of the invention to provide a servo device performing a superintendence of a rotational speed in a rotational speed control with a high degree of control capacity.

It is another object of the invention to provide a servo device provided with a mechanism for detecting a rotational speed during a transition from the start of the motor to a steady state with a constant rotational speed.

It is an additional object of the invention to provide a servo device provided with a mechanism for detecting a rotational angular acceleration during a transition from the start of the motor to a steady state with a constant rotational speed.

The first object of the invention, as will appear from the reading of the following specification, are achieved by a servo device for servo controlling a spindle motor, comprising: a unit for generating a signal with at least two cycles during one full rotation of a rotator in the spindle motor in accordance with a rotational movement of the rotator; a unit for measuring a time required for each of the two periods; a unit for storing at least two target time corresponding to the two periods respectively; and a speed controlling unit for controlling a rotational speed of the rotator at the basis of the comparison between the respective measured period and the corresponding target period.

In operation, the signal having at least two cycles during one; full rotation of the rotator is generated by the generating unit. Preferably, the signal provided with four cycles during one full rotation are generated. The respective time required for each cycle of the signal, that is the respective period is measured by the measuring unit. The target periods corresponding to the measured periods are stored in advance in a memory. The controlling unit compares the respective measured period with the corresponding target period and thereby controls the speed of the rotator. Therefore, a error of the measurement of periods at a moment are associated with the time of half the period preceding the current period, thereby the detection with a shorter delay time can be performed in comparison with the detection at the time of a half rotation.

The second object is attained by providing a servo device for servo controlling a spindle motor, comprising: a unit for generating a signal with at least two cycles during one full rotation of a rotator in the spindle motor in accordance with a rotational movement of the rotator; a unit for measuring a time required for each of the cycles; a unit for storing at least two target periods corresponding to the measured times, or measured periods respectively; a unit for computing a time required for one full rotation of the rotator from the plural measured periods; a unit for judging a quality of the rotational speed of the rotator from the computed time required for one full rotation of the rotator; and a speed controlling unit for controlling a rotational speed of the rotator at the basis of the computed time required for one full rotation and the target periods. In an operation, the period data for one full rotation is produced and the data is used for the judgment of the rotational speed. Thus, the judgment with a high degree of accuracy is available.

The third object is achieved by a servo device comprising a unit for generating a signal with at least two cycles during one full rotation of a rotator in the spindle motor in accordance with a rotational movement of the rotator; a unit for measuring a time required for each of the cycles; a unit for storing at least two target periods corresponding to the measured times, or measured periods respectively; a unit for computing a time required for one full rotation of the rotator from the plural measured periods; a first judging unit for determining a quality of the rotational speed of the rotator from the computed time required for one full rotation of the rotator; a unit for computing a rotational angular acceleration from the computed time required for one full rotation; a second judging unit, for determining whether a rotational state of the rotator is stable or not from the computed rotational angular acceleration; and a speed controlling unit for controlling a rotational speed of the rotator at the basis of the plural measured periods and the target periods.

The fourth object is achieved by a servo device for servo controlling a spindle motor, comprising: a unit for generating a signal with at least two cycles during one full rotation of a rotator in the spindle motor in accordance with a rotational movement of the rotator; a unit for measuring a time required for each of the cycles; a unit for storing at least two target periods corresponding to the measured times, or measured periods respectively; a unit for computing a rotational angular acceleration from the plural measured periods; a judging unit for determining a quality of the rotational speed of the rotator from the computed rotational angular acceleration; and a speed controlling unit for controlling a rotational speed of the rotator at the basis of the plural measured periods and the target periods.

Further objects and advantages of the present invention will be apparent from the following description of the preferred embodiments of the invention as illustrated in the accompanying drawings.

BRIEF DESCRIPTION OF THE DRAWINGS

FIG. 9 shows a relation between the angular acceleration detected every one rotation of the motor and the signal representing the number of rotations in the servo device according to the invention;

FIG. 10 shows a side view of main constructional elements disposed around a spindle motor in the magnetic apparatus;

DESCRIPTION OF THE PREFERRED EMBODIMENTS

Figure 1:
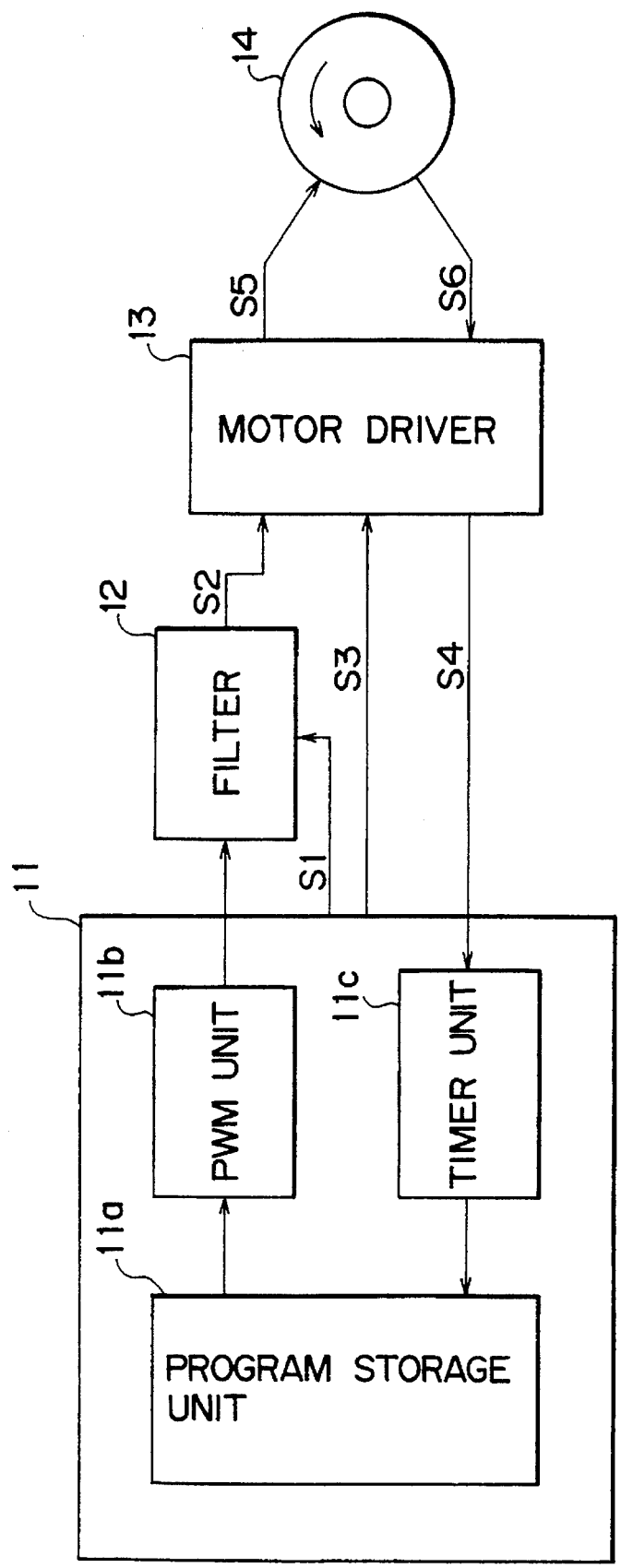
FIG. 1 shows a block diagram of an embodiment of a servo device according to the present invention.

FIG. 1 shows a block diagram of an embodiment of a servo device according to the present invention. In FIG. 1, the reference numeral 11 denotes a microcomputer; 11a, a program storage unit; 11b, a PWM unit; 11c, a timer unit; 12, a filter; 13, a motor driver; and 14, a spindle motor. In addition, the symbol S1 denotes a sensitivity changing signal; S2, a current controlling signal; S3, a rotational direction signal; S4, a rotation pulse (an one-phase Hall-effect detection signal); S5, a deriving signal; and S6, a rotational phase signal.

Figure 2:
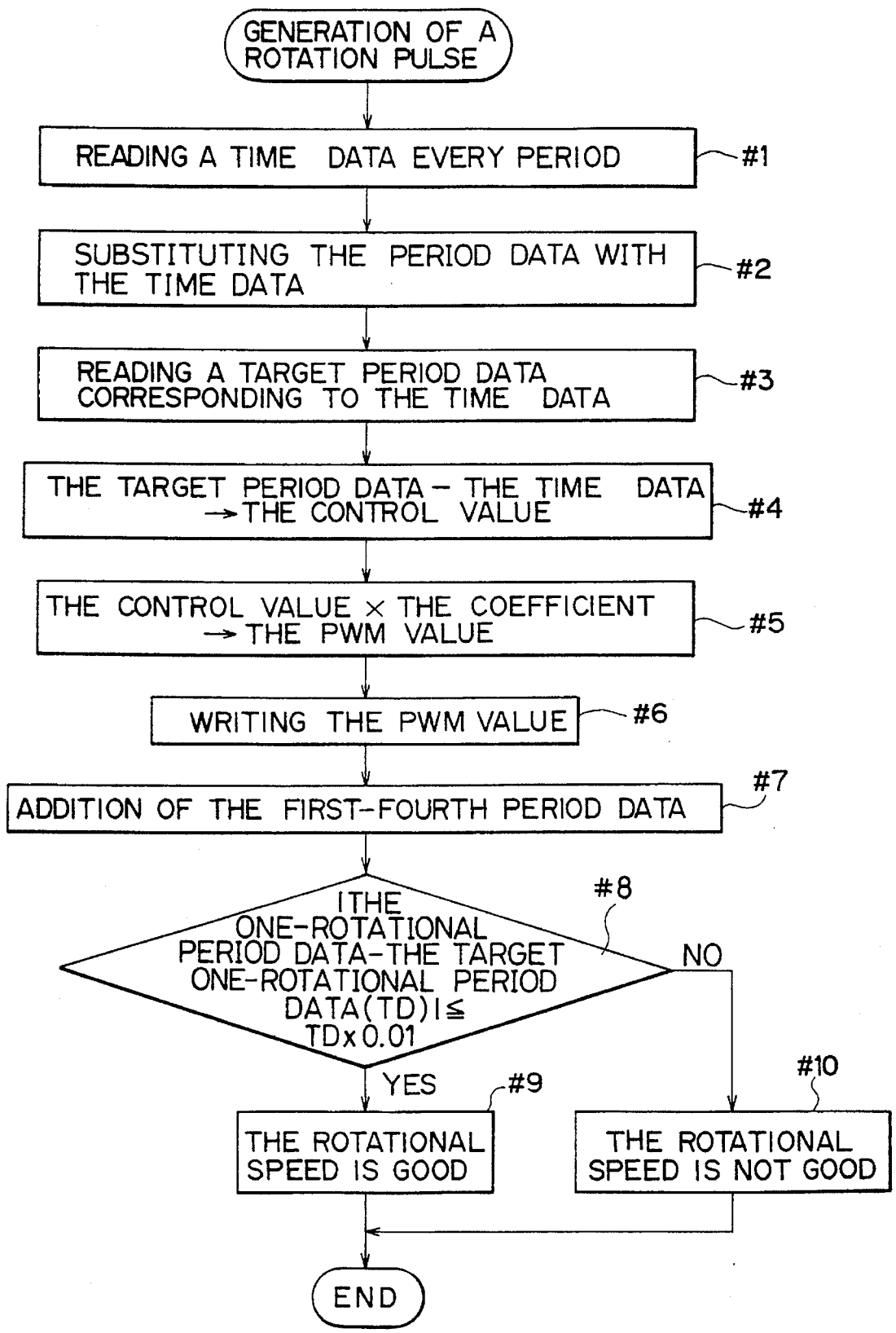
FIG. 2 shows a flowchart diagram of a flow of a main process of the rotational speed control and the speed superintendence in the servo device according to the invention.

Preferably, the microcomputer 11 is arranged in the form of M37450 type and is provided with the program storage unit 11a, the PWM unit 11b and the timer unit 11c. The microcomputer 11 performs a control as shown in FIG. 2 in accordance with a program stored in the program storage unit, 11a.

Next, the description will be directed to an operation of a speed control of the servo device.

One period of the rotation pulse S4 is measured by the timer unit 11c when the spindle motor 14 starts to rotate. The program in the program storage unit 11a is enabled every when an interrupt is caused by the rise of the rotation pulse S4. The measured time data is output to the PWM unit 11b through the program storage unit 11a. The PWM unit 11b is provided with a memory for storing a plurality of measured time data, for example which corresponds to four periods in the case of FIG. 14, in which these measured data are stored in the corresponding areas thereof respectively. There is also provided with a memory for storing the summation data of the plurality of measured time data.

The PWM unit 11b computes a control quantity from the time data which is measured whenever an interruption is occurred and the corresponding to target period data which is determined in advance. The value of the control quantity represents information about an speed error of the period. The control value is multiplied with the predetermined coefficient for generating a driving current of the motor 14 in proportion to the error of the period. The result is that the PWM value is obtained and is written in an internal memory for the purpose of changing a duty of the PWM signal.

In the aforementioned operation, the error or the control value) is calculated from the measured data for each period of the rotation pulse S4, for example each of the four periods, and the corresponding (synchronizing) target one period data with respect to the measured period, and then the current control signal S2 indicating a current value of a rotational speed correcting the rotational period error is output to the motor driver 13 via the filter 12.

Thus, the spindle motor 14 has the target period data each corresponding to the measured time data. Since an error of the measurement of periods at a moment is associated with the time of half the just prior cycle preceding the current cycle of the detecting signal, the motor 14 is excited by the driving current S5 with a shorter delay time than that at the time of half one full rotation.

The servo device for the spindle motor according to the invention performs the storing operation of the measured period data of each rotational pulse S4 and the corresponding target data of the rotational pulse S4, and the computing operation of the control quantity by means of the software process, or the program in the program storage unit, thereby the device can provide the speed control with the reduced time delay.

Next, the description will be directed to an operation of the speed superintendence.

Figure 14:
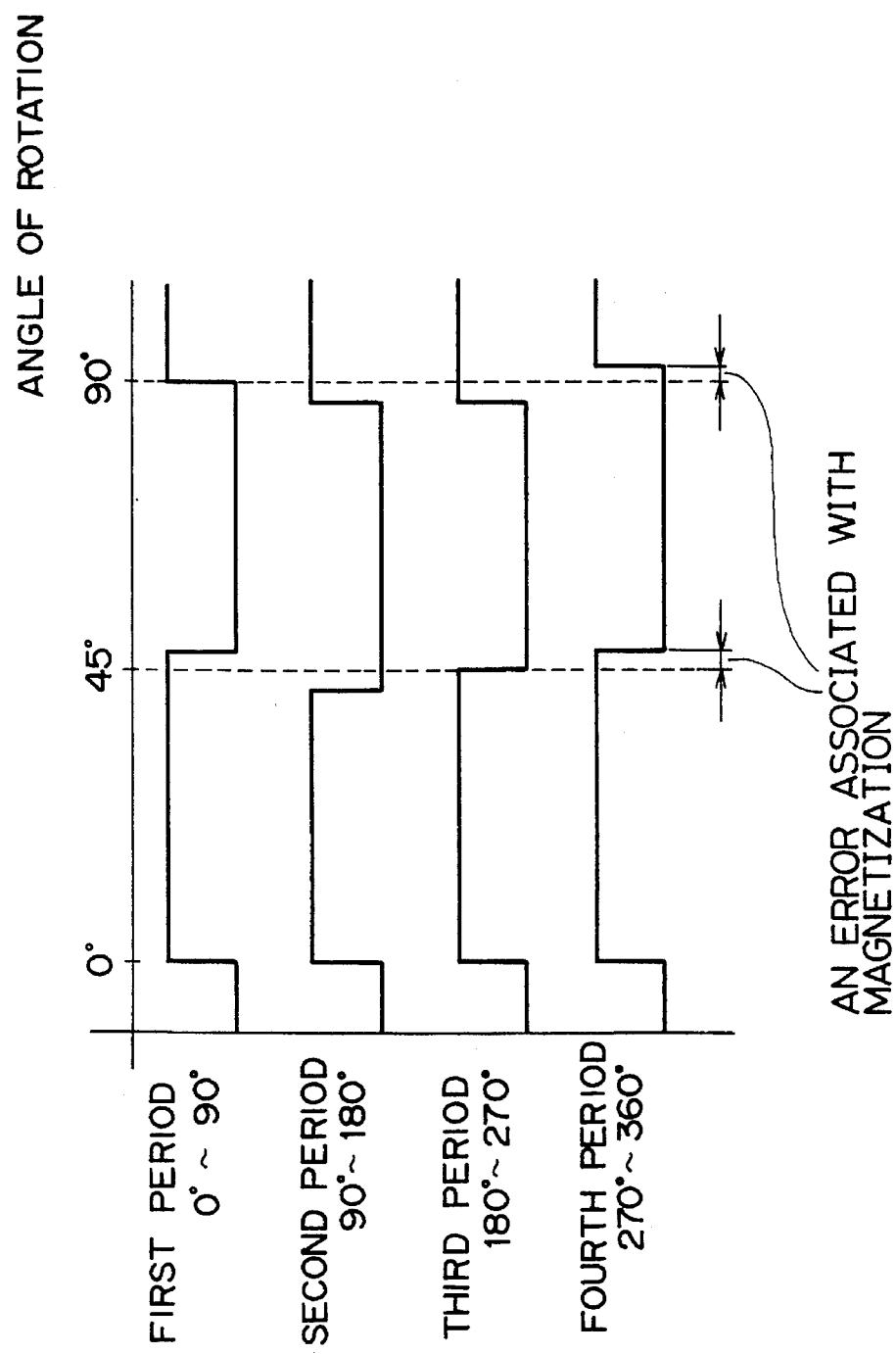
FIG. 14 shows a timechart diagram representing an example of an one-phase detecting signal detected by a Hall-effect element in the spindle motor including the rotator having an error associated with the magnetization.

The PWM unit 11b is provided with a memory for storing a plurality of measured time data, for example which corresponds to four periods in the case of FIG. 14, in which these measured data are stored in the corresponding areas thereof respectively. These measured time data every period are added together, and then the measured time data of the one full rotation of the spindle motor 14 is obtained and stored.

For example, if the device requires that the accuracy of the rotational period is 1%, that is the percentage of the time regulation is 1, the obtained one-rotational period data is compared with a first value (99% of the target one-rotational period data) and a second value (101% of the target one-rotational period data), that is threshold values and the quality of the rotational speed of the motor 14 is determined by the comparison. If the data is equal to the first value, the second value, or more than the first value and less than the second value, it is determined that the quality is within a predetermined range. The application of the full one-rotational period data to the decision of the quality of the rotational speed can provide a determination with a higher degree of accuracy.

The description will be directed to flow of the rotational speed control and the speed superintendence in the servo device of the spindle motor according to the invention.

FIG. 2 shows a flowchart diagram representing flow of a main processing of the rotational speed control and the speed superintendence in the servo device for the spindle motor according to the invention. In FIG. 2, the symbols #1–#10 denote steps of the flowchart diagram.

The rise of a rotational pulse of the spindle motor triggers the start of the flow, and then a time data, or a first measured time data, is read out from the timer unit in the step #1. In the next step #2, the time data is written in an area of the memory capable of storing time data every period.

Next, the flow shifts to the process of the speed control. In the next step #3, the target period data corresponding to the measured time data is read out. The measured time data is subtracted from the target period data and then the control value is calculating in the step S4.

In the step #5, the calculated control value is multiplied with the coefficient and then the PWM value is calculated. The operated PWM value is written in the internal memory. The aforementioned steps #3–#6 represent the flow of the speed control.

The program performs a judgment of the quality of the rotational speed. In the step #7, the first to fourth measured time data, which corresponds to the first to fourth periods respectively, are added together and then the full one-rotational data is obtained. The flow shifts the step #8, and it is judged whether the obtained one-rotational period data is within a defined value region from the first value (99% of the target one-rotational period data) to the second value (101% of the target one-rotational period data). In the judgment of the step #8, if the full one-rotational data is within the defined value region, the flow shifts to the step #9 and it is concluded that the device has a rotational speed within the predetermined range.

In the determination of the step #8, if the real one-rotational data is not within the defined value region, the flow shifts to the step #10 and it is concluded that the device does not have a rotational speed within the predetermined range. The aforementioned steps #7–#10 represent the flow of the determined of the quality of the rotational speed.

In the servo device for the spindle motor according to the invention, the aforementioned operation of the program can realize the servo system with the reduced time delay, and therefore the precise speed control and the speed superintendence come true.

In the flowchart as shown in FIG. 2, the flow represents the case that a plurality of rotational pulses are generated in one full rotation, for example one rotation is divided into three or four cycles and each rotational pulse is produced every cycle, and time data measured by the timer unit are stored in the memory every cycle. In other words, the rotational signal (or the detecting signal) is provided with at least two cycles during one full rotation of the rotator. The time required for each of the cycles is measured by the timer unit to derive the period data for the cycle in question. In a preferred embodiment that the good responsibility of the motor is satisfied, the measured time data may be stored in the memory every two cycles.

The operation described in the flowchart of the FIG. 2 are performed every cycle of the rotational signal, however, in a preferred embodiment the timer unit may measure a time required for the low level of the rotational pulse and for the high level of the rotational pulse to control the rotational speed of the motor.

Next, the description will be directed to a second embodiment of the servo device for the spindle motor according to the invention.

The embodiment is characterized in that target periods at the predetermined number of rotations of the motor are updated at the basis of measured periods each required for the cycles of one full rotation when the determination result of the quality of the rotational speed changes from a state where the rotational speed is not within the predetermined range to a state where the rotational speed is within the predetermined range. The servo device according to the second embodiment is also provided with a mechanism for obtaining an information with respect to an error associated with the magnetization of a magnet of a rotator.

Measured time data includes a error associated with the magnetization as shown in FIG. 14. That is, in a case that the target full period (or the desirable full one-rotational time, data) representing the target speed is divided equally into a plurality of periods corresponding to the target periods respectively, the error associated with the magnetization causes a error in the respective measured time data even if the motor rotates at a constant speed.

Therefore, this embodiment measures the error associated with the magnetization and corrects the target full period data.

Next, the description will be directed to means for the purpose, concretely to a software processing.

Figure 3:
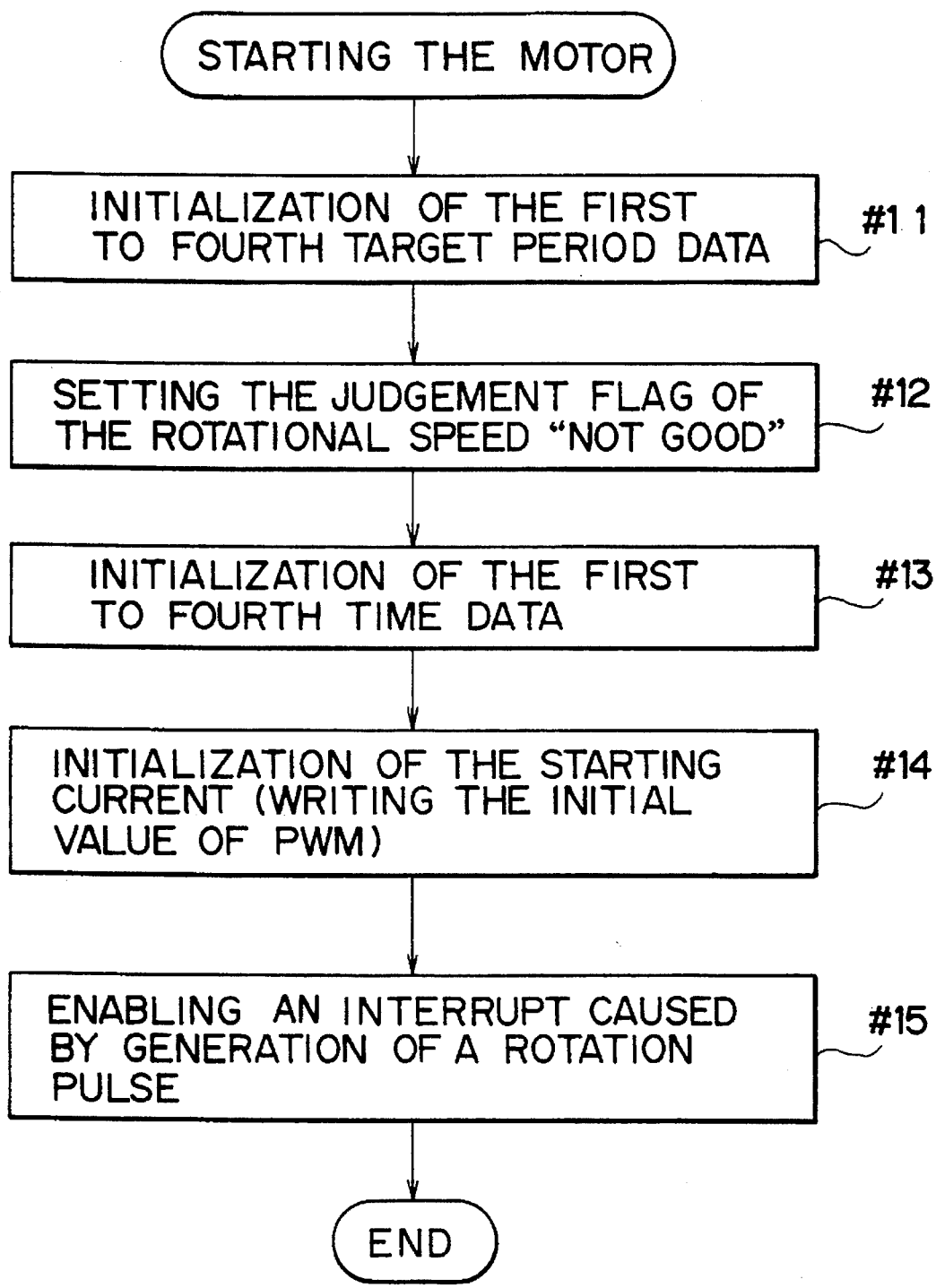
FIG. 3 shows a flowchart diagram of a flow of main process at the time starting the motor in a stop state in the servo device according to the invention.

FIG. 3 shows a flowchart diagram representing a flow of a main processing at the time starting the motor in the stop state in the servo device for the spindle motor according to the invention. In the figure, the symbols #11–#15 denote steps of the flowchart.

The flowchart in FIG. 3 represents the steps performing a few initializations at the time starting the spindle motor and applying a driving current to the motor.

In the step #11, the first to fourth target period data are initialized. In this case, since the one full rotation is divided into the four periods, one-fourth value of the target full period is set as a value of these target period data. In the step #12, the determination flag of the rotational speed is initialized to have an initial value representing a rational speed which is not within the predetermined range.

In the next step #13, the first to fourth measured time data, or the four time data which are to be measured are initialized. In this situation, since this initialization has no effect on the judgment of the rotational speed, a larger value can be selected for the purpose of representing the stop state.

In the step #14, a current for starting the motor is applied to the motor, thereby the motor starts to rotate.

In the step #15, an interrupt which is caused by the rise of a rotation pulse is enabled, and specific functions of the program appropriate to the interrupt is started. In this case, the motor starts to rotate by the interrupt.

Thus, the motor in the stop state starts to rotate according to the aforementioned steps #11–#15.

Next, the description will be directed to a flow of the motor speed control.

Figure 4A:
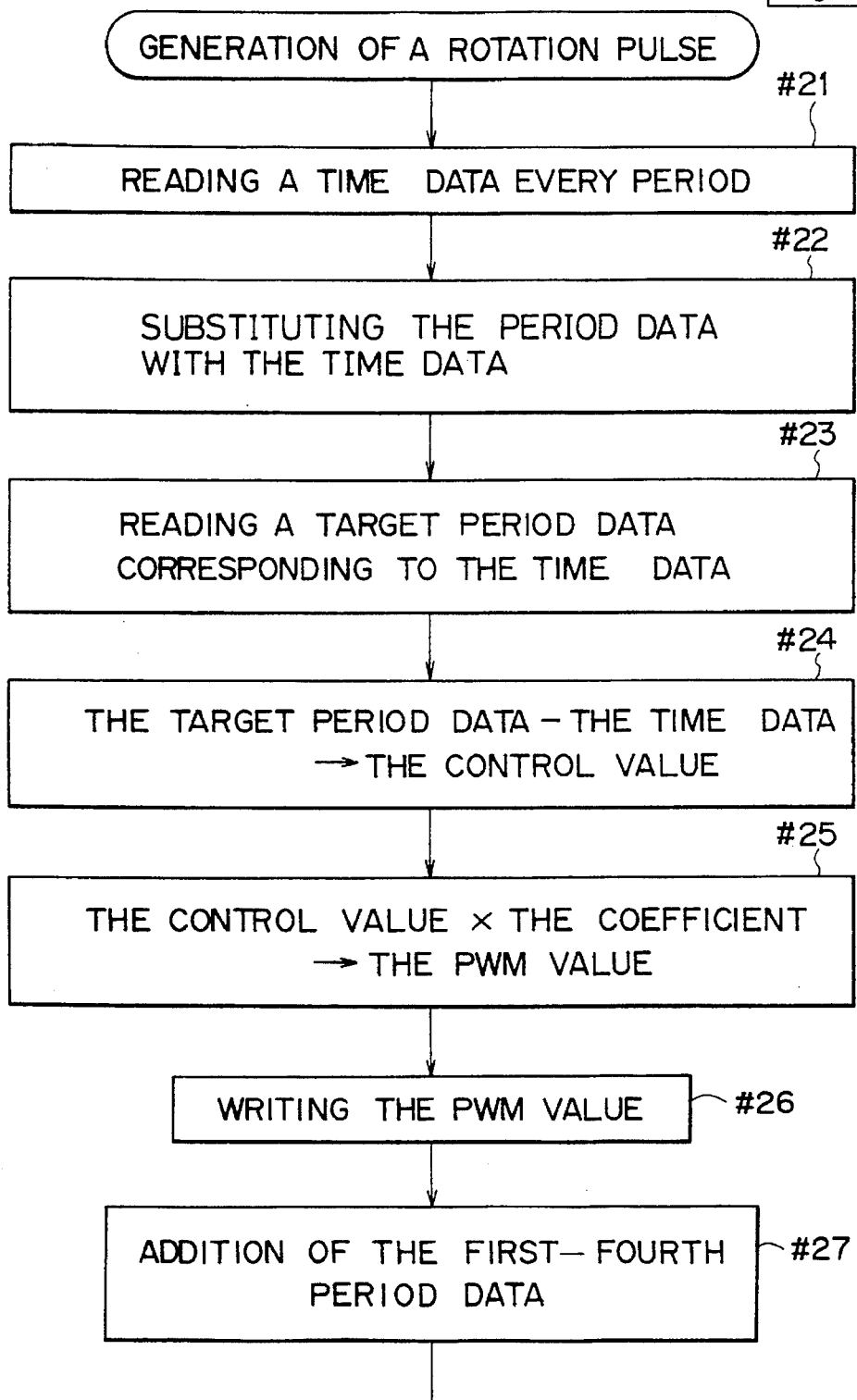
FIG. 4 shows a flowchart diagram of a flow of a main process of the speed control of the motor in the servo device according to the invention.
Figure 4B:
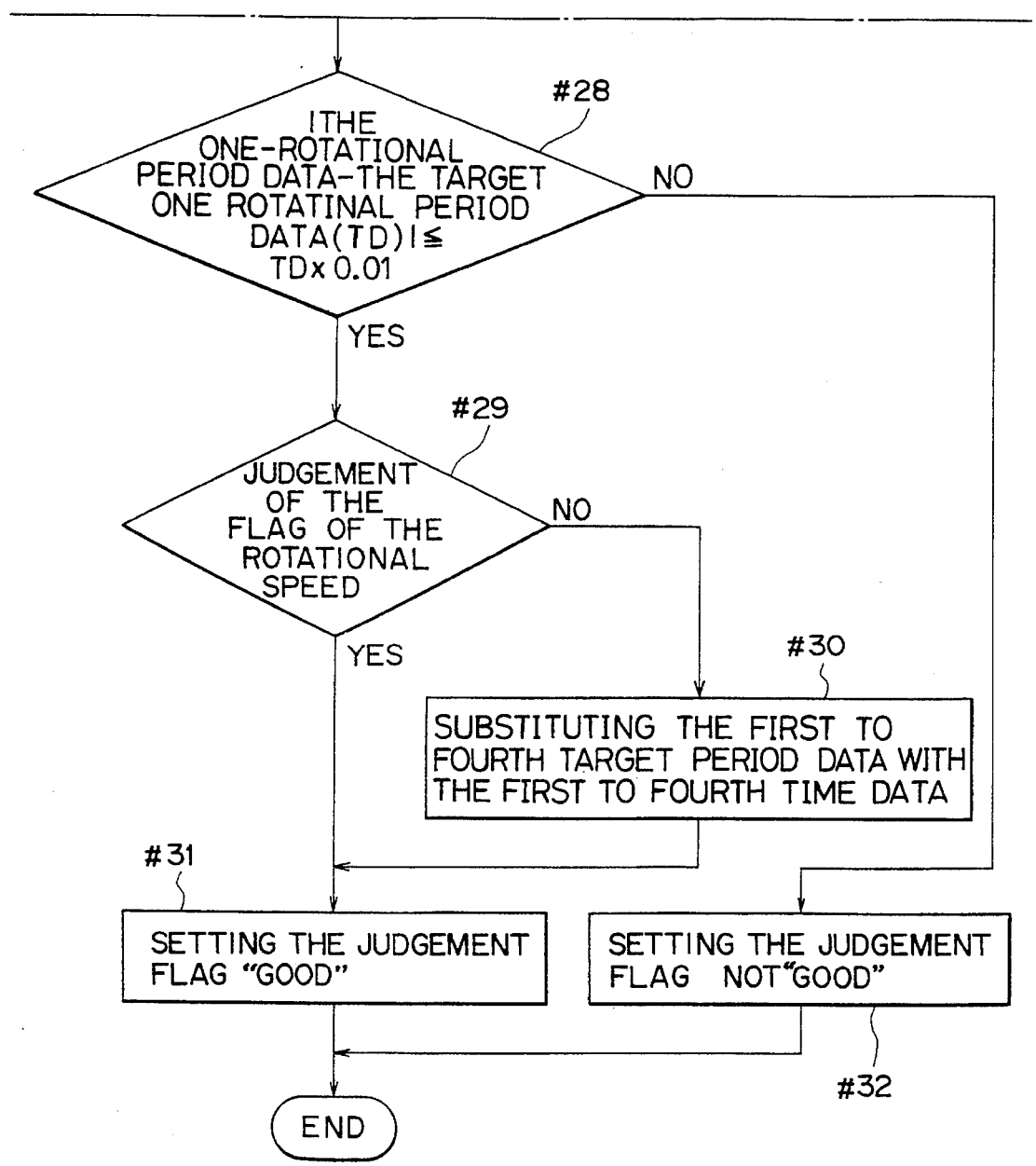

FIG. 4 shows a flowchart diagram of the flow of a main processing of the motor speed control in the servo device for the spindle motor according to the invention. In the figure, the symbols #21–#32 denote steps of the flowchart.

In the flowchart of FIG. 4, the steps #21–#28 are similar to the steps #1–#8 in the FIG. 2.

In FIG. 4, the motor is started and the rotational speed continues to increase. Therefore, the result (the flag) of the determination of the speed quality shows a rational speed not within the predetermined range during the increase of the rotational speed. These steps #21–#27 represent the speed control included in the flow of FIG. 4.

Next, the program performs the judgment of the quality of the rotational speed.

In the step #28, it is judged whether the obtained one-rotational period data is within a defined value region from the first value (99% of the target one-rotational period data) to the second value (101% of the target one-rotational period data).

In the judgment of the step #28, if the one-rotational period data is within the defined value region, the flow shifts to the step #29 and it is determined whether the determination flag of the rotational speed is within the predetermined range or is not within the predetermined range. If the flag represents a rotational speed which is not within the predetermined range, the flow shifts to the step #30 and the first to fourth target period data are substituted with the first to fourth measured period data which are stored in the memory, and then the flow shifts to the step #31. On the contrary, if the judgment result of the rotational speed represents within the predetermined range in the step #29, the flow shifts to the step #31.

In the step #31, the judgment flag of the rotational speed is set to be within the predetermined range and the flow is terminated as shown in FIG. 4.

On the contrary, if the one-rotational period data is not within the defined value region in the determination of the step #28, the flow shifts to the step #32 and the determination flag of the rotational speed is set to represent a rotational speed which is not within the predetermined range and then the flow is terminated as shown in FIG. 4. The aforementioned steps #7–#10 represent the flow of the judgment of the quality of the rotational speed. In the aforementioned steps #28–#32, the judgment of the speed quality is conducted.

In the second embodiment according to the invention, the speed control and the judgment of the speed quality are performed as mentioned above.

Now, the description will be directed to the summary of the operation by the second embodiment.

The rotational speed continues to increase after starting the motor. Therefore, the result (the flag) of the determination of the speed quality shows a rotational speed not within the predetermined range during the, increase. After that, when the determination result is changed to represent a rotational speed within the predetermined range, the flag represents the status at the just prior period, and therefore the step #30 in the flow of FIG. 4 is executed.

In this case, the measured time data, which involves a error associated with the magnetization, has a value close to that of the target rotational speed. Therefore, the set (update) of the target period is made at the basis of the measured time data, that is the first to fourth target periods including the error associated with the magnetization respectively are set, and this results in suppressing an undesirable variation of the control quantity.

In a preferred embodiment, the initial value of the target period can be updated by the judgment which is conducted using the measured time data instead of the full one rotational period data in the step #28 of FIG. 4. Similarly, the first to fourth target period data including the error associated with the magnetization respectively can be set, and this results in suppressing an undesirable variation of the control quantity.

Next, the description will be directed to a third embodiment of the servo device for the spindle motor according to the invention.

The embodiment is characterized in that there is provided with threshold changing means for changing a threshold value for the determination of the speed quality which is conducted by speed quality judging means, and a value equal to or more than that, of the target rotational speed is selected as an initial value of the threshold. The servo device according to the third embodiment is also provided with a mechanism for changing an update condition upon an acquisition (an update) of an information with respect to an error associated with the magnetization of a magnet of a rotator.

In a case that it is concluded that the real one-rotational period data is within the defined value region at the basis of the determination in the step #28 in the flow of FIG. 3 when the target periods are updated from the measured time data, the flow shifts to the next step #29 and it is determined whether the result of the determination of the rotational speed is within the predetermined range.

In this case, the full one-rotational period data has an error of ±1% as seen clearly from the threshold value of the determination.

In addition, it must be noted that the measured period data is more than the target data and therefore the updated data is biased towards the minus side with respect to the rotational speed because the motor rotates all a lower speed and is accelerated to have a high speed at the time starting the motor. It is necessary to set the lower speed side of the threshold value for the determination to be smaller at the time of the start and to return the lower speed side to the original threshold value for the judgment after the update of the target period in order to dissolve such a disadvantage.

The measured time data can be substituted for the target period data directly by means of such a control operation, and this results in simplifying the control processing.

Next, the description will be directed to a fourth embodiment of the servo device for the spindle motor according to the invention.

The embodiment is characterized in that the device can compute a rotational angular acceleration by a simple method.

The reciprocal of a period required for one full rotation represents a rotational speed. For example, in a case that a rotational angular acceleration is computed from two consecutive rotational speed (period) data, the general expression for the rotational angular acceleration is given by $$\text{angular acceleration} = \Delta V/\Delta t$$
$$= [1/T(M) - 1/T(M-1)]/T(M')$$

where the acceleration: a rate of change of the speed per time;

T(M): a newer one in the two consecutive rotational period data; and

T(M−1): a: older one in them.

And then, in the case of two consecutive rotations, the newer data is adopted as the time Δt. That is, the relation T(M')=T(M) is established.

To obtain the time Δt more precisely, T(M') must be calculated by the following expression $$T(M')=[T(M)+T(M-1)]/2$$

Figure 5:
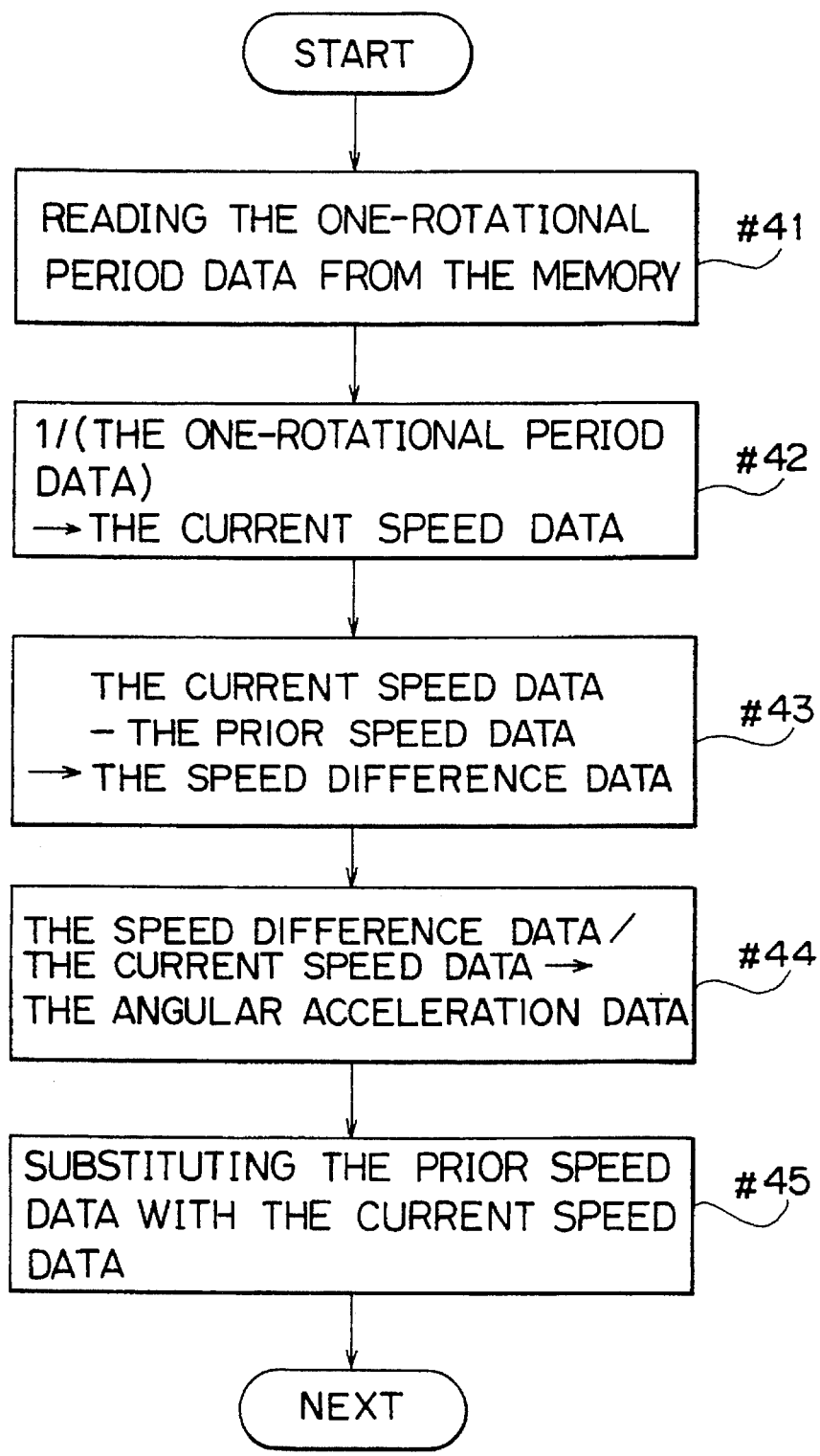
FIG. 5 shows a flowchart diagram of a flow of a main process computing the angular acceleration of the motor in the servo device according to the invention.

FIG. 5 shows a flowchart diagram representing a flow of a main process calculating an angular acceleration of the motor in the servo device for the spindle motor according to the invention. In the figure, the symbols #41–#45 denote steps in the flowchart.

In the step #41, an information with respect to the full one rotational period is read out from the memory. In the step #42, the reciprocal of the period data is set as the current speed data. In the next step #43, the prior speed data is subtracted from the current speed data and the result is that the speed difference data is obtained.

In the step #44, the obtained speed difference data is divided by the current speed data, thereby the angular acceleration data is obtained.

In the step #45, the prior speed data preceding the current data is substituted with the current speed data which is written in the memory. That is, the prior speed data is updated.

In the aforementioned steps #41–#45, an information with respect to period data is obtained which is used for the detection of the next real one-rotational speed. In a preferred embodiment which is more of practical use, the subtraction operation can be performed without the calculation of the reciprocal of the period data on the assumption that T(M') described by the aforementioned expression is constant on condition that the rotational speed is almost within the target rotational speed region. In this case, the angular acceleration is obtained by the following operation; the acceleration ∝—[T(M) —T(M−1)].

Figure 6:
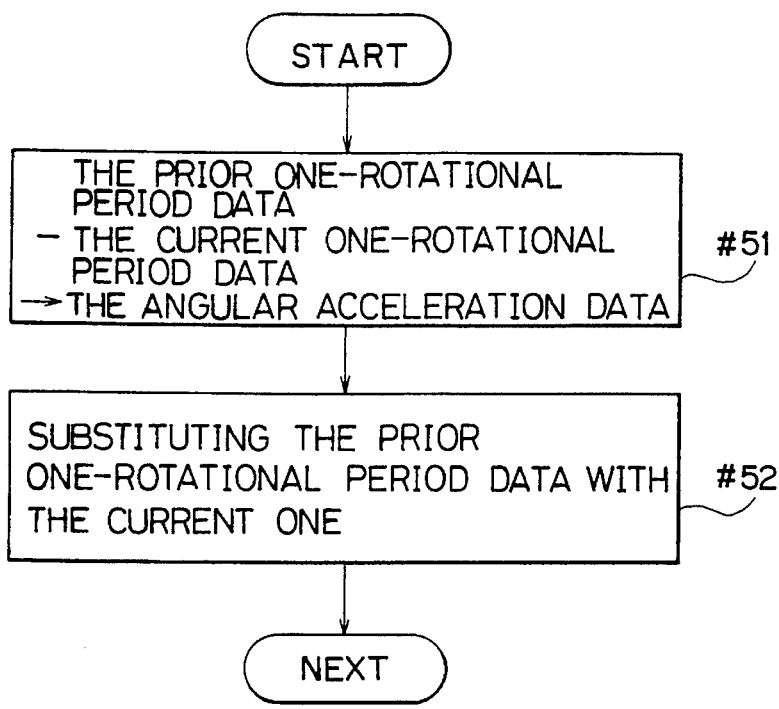
FIG. 6 shows a flowchart diagram of a flow of a process computing the angular acceleration of the motor by a simple method in the servo device according to the invention.

FIG. 6 shows a flowchart diagram representing a flow of a process simply computing the angular acceleration of the motor in the servo device for the spindle motor according to the invention. In the figure, the symbols #51–#52 denote steps of the flowchart.

In FIG. 6, the process simply computing the angular acceleration of the motor is illustrated. It is clear that this process is extremely simplified from the comparison between FIG. 6 and. FIG. 5.

In the step #51, the prior one-rotational period data is subtracted from the current one-rotational period data and the result is that the angular acceleration data is obtained.

In the step #52, the prior period data is substituted with the current period data which is written in the memory. That is, the prior period data is updated.

In the aforementioned steps #51–#52, an information with respect to period data is obtained which is used for the detection of the next real one-rotational speed.

Next, the description will be directed to a fifth embodiment of the servo device for the spindle motor according to the invention.

The control process at the time starting the motor is similar to that of the second embodiment and is performed in accordance with the flow in FIG. 3. The speed control process according to the fifth embodiment has many common parts with the second embodiment.

For example, when the motor is started the rotational speed continues to increase, and the result (the flag) of the determination of the speed quality shows a rotational speed which is not within the predetermined range during the increase of the rotational speed as shown in FIG. 4. The operation corresponds to the steps #21–#27 in the flow of the speed control of FIG. 4.

Next, the program performs the judgment of the quality of the rotational speed in accordance with the steps #28–#32 in FIG. 4.

When the judgment is changed to show a rotational speed which is within the predetermined range, the flag represents: the status at the just prior period, and therefore the step #30 in the flow of FIG. 4 is executed.

In this case, the measured time data, which involves a error associated with the magnetization, has a value close to that of the target rotational speed. The motor is accelerated at the time starting the motor and therefore the one-rotational speed continues to vary every moment.

In this fifth embodiment, the angular acceleration is computed and it is determined whether the rotational speed is stable or not at the basis of the acceleration.

Figure 7:
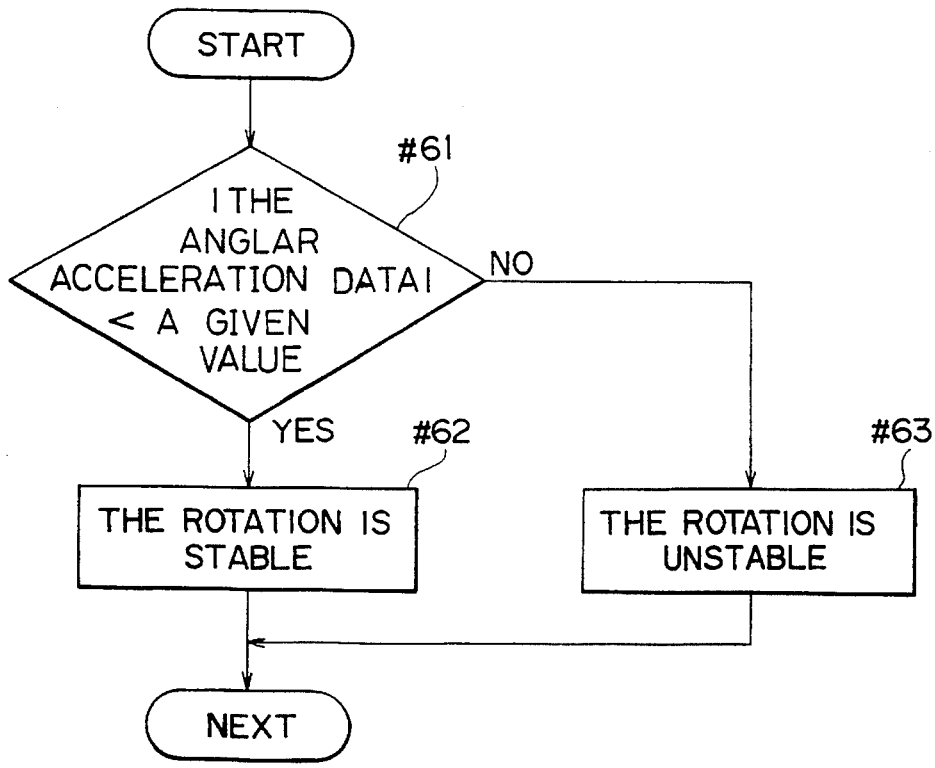
FIG. 7 shows a flowchart diagram of a flow of a process determining the quality of the angular acceleration of the motor in the servo device according to the invention.

FIG. 7 shows a flowchart diagram representing flow of a processing of the determined of the quality of the angular acceleration in the servo device for the spindle motor according to the invention. In the figure, the symbols #61–#63 denote steps of the flowchart.

In the step #61, it is determined whether the angular acceleration data is within a defined value region. If the absolute value of the angular acceleration data is less than a given value, the flow shifts to the step #63 and it is concluded that the rotation is stable (i.e., the rotational speed is within the predetermined range). Then, the flow in FIG. 7 is terminated.

If the absolute value of the angular acceleration data is equal to or more than the given value, the flow shifts to the step #63 and it is concluded that the rotation is unstable (i.e., the rotational speed is not within the predetermined range). Then, the flow in FIG. 7 is terminated.

When the rotation becomes stable, the set (update) of the target period is made from the measured time data, that is the first to fourth target periods including the error associated with the magnetization respectively are set, and this results in suppressing an undesirable variation of the control quantity.

Figure 8A:
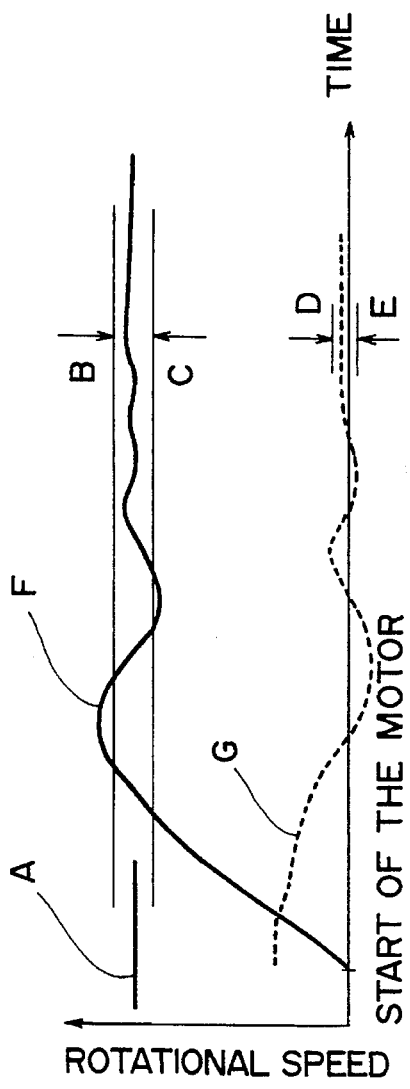
FIG. 8 shows a flowchart, diagram of a flow of a process determining the quality of the rotational speed and the angular acceleration of the motor in the servo device according to the invention.
Figure 8B:
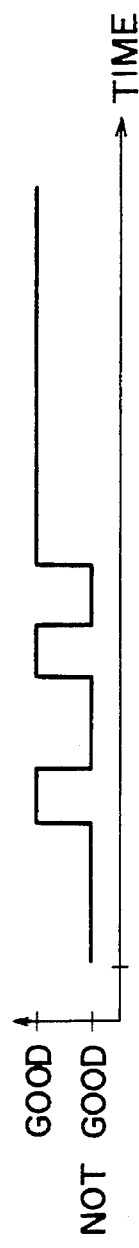
Figure 8C:
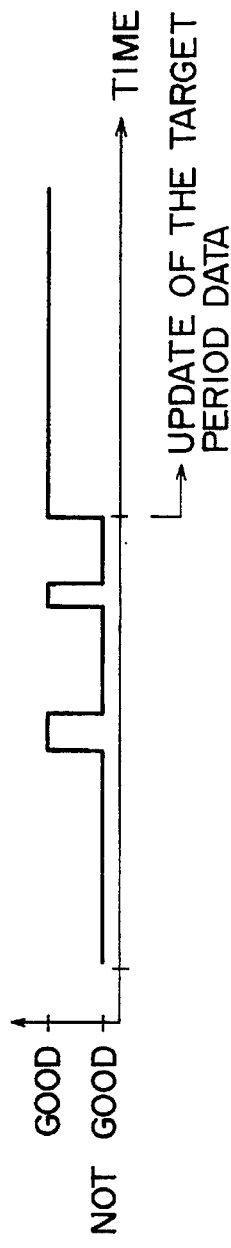
Figure 11:
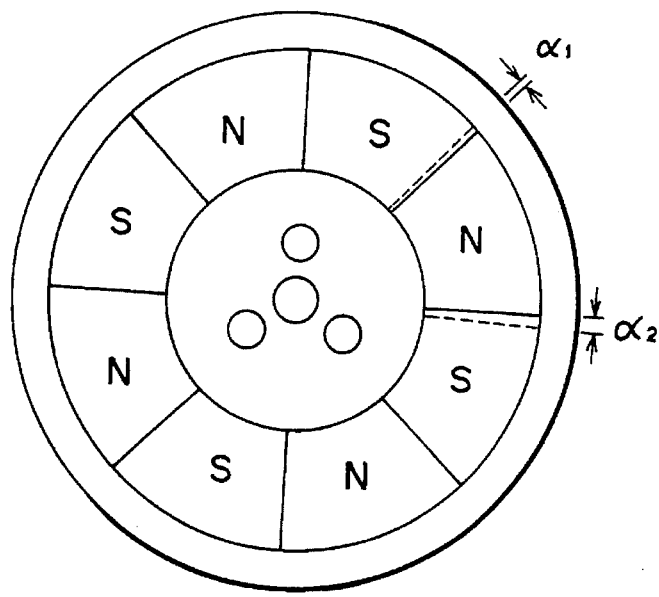
FIG. 11 shows a plane view showing an example of the magnetizing state of the magnet of the rotator.
Figure 12:
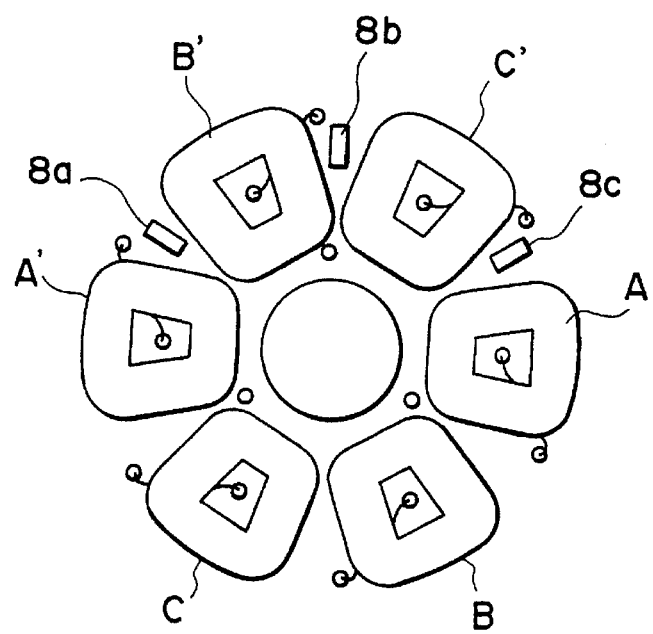
FIG. 12 shows a plane view illustrating a configuration of Hall-effect elements and the field windings of the rotator.
Figure 13:
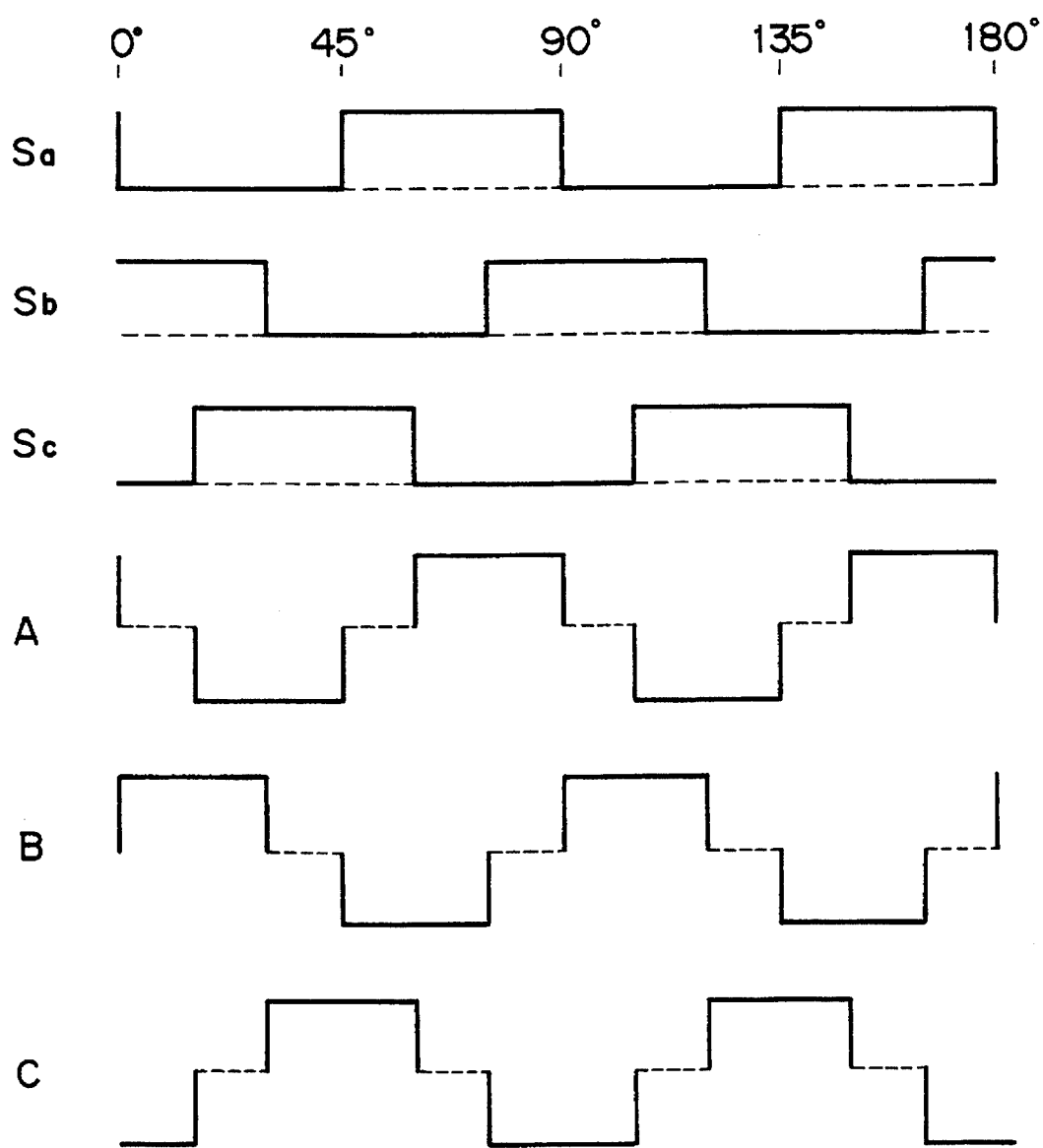
FIG. 13 shows a timechart diagram representing an example of the rotator shown in FIG. 12 and detecting signals generated by the Hall-effect elements.

FIG. 8 shows a times diagram representing an operation at the time determining the quality of the rotational speed and the rotational angular acceleration of the motor in the servo device for the spindle motor according to the invention. FIG. 8a shows the rotational speed and the angular acceleration which vary every moment at the time starting the motor. FIG. 8b shows time-varied results of the judgment of the rotational speed in accordance with the variation of the speed. FIG. 8c shows time-varied results of the determination of the rotational angular acceleration in accordance with the variation of the acceleration. In FIG. 8a, the horizontal axis represents the time and the vertical axis represents the rotational speed and the rotational angular acceleration. The symbol A denotes the target rotational speed; B and C, the defined region for the determination of the rotational speed; D and E, the defined region for the determination of the angular acceleration; F, the curve representing the variation of the rotational speed; and G, the curve representing the variation of the angular acceleration.

When the motor is started, a value of the target rotational speed A is selected as an initial value as shown in FIG. 8*a*. The defined region form B and C for the determination of the rotational speed and the defined region from D and E for the determination of the angular acceleration are set. The motor is accelerated in accordance with the speed curve F after the start of the motor. The angular acceleration varies in accordance with the angular acceleration curve G.

The detecting signal in FIG. 8*b* represents the results of the determination of the rotational speed which correspond to the speed curve A in FIG. 8*a*. The detecting signal in FIG. 8*c* represents the results of the determination of the rotational angular acceleration which correspond to the angular acceleration curve G in FIG. 8*a*.

In this fifth embodiment, the target period data is updated when the result of the determination of the rotational angular acceleration is within a predetermined range.

In a preferred embodiment, the servo device is provided with a mechanism for utilizing an update condition of an error associated with the magnetization to the determination of the rotational angular acceleration. The update is executed by substituting the target period data with the measured period data having the error. The servo device is also provided with a threshold changing mechanism for changing a threshold value of the rotational angular acceleration of the rotator used for the determination of the quality of the rotational angular acceleration. When the motor starts to rotate and reaches a steady state, the threshold value for the determination is set to be smaller at the time of the start and then is returned to the original threshold value for the determination after the update of the target period.

Next, the description will be directed to a sixth embodiment of the servo device for the spindle motor according to the invention.

The construction of the embodiment is similar to that of the fourth embodiment except that the speed quality judging means are eliminated.

That is, the determination whether the motor is stable or not is conducted using only the result of the detection of the acceleration when the motor starts to rotate and then reaches a steady rotational state.

Next, the description will be directed to a seventh embodiment of the servo device for the spindle motor according to the invention.

The construction of the embodiment is similar with that of the fifth embodiment, however, a part thereof is modified. The servo device according to the seventh embodiment is also provided with a mechanism for detecting a rotational angular acceleration with a high degree of accuracy.

Concretely, the quality of the angular acceleration is determined when a signal representing the number of rotations is generated. On the other hand, the quality is determined when the motor rotates by the one full rotation in the fifth embodiment.

FIG. 9 shows a relation between the angular acceleration detected every one full rotation of the motor and the signal representing the number of rotations in the servo device for the spindle motor according to the invention. In the figure, the horizontal axis represents an angle of rotation and symbols X–Z denote timing points.

In FIG. 9, a rotational signal with four cycles are detected during one full rotation of the motor as mentioned above by reference to FIG. 14. That is, the sum of angles of rotation 360° corresponding to the sum of the four periods is constant, however, each of the periods and a ratio of duty are adversely affected by the error associated with the magnetization. For example, the detecting signal is delayed by the error associated with the magnetization with respect to the angle of rotation 45° in the first cycle, that is the first period. On the contrary, the detecting signal is put forward with respect to the angle 45° in the second cycle, that is the second period.

To dissolve such a disadvantage, the control of the rotational speed is performed using an information with respect to accelerations which are obtained every one-fourth full rotation, that is four acceleration data obtained every one full rotation instead of the one-rotational data. In this case, the computation of the rotational angular acceleration obeys the expression described at the explanation of the fifth embodiment.

In FIG. 9, four acceleration data in total are calculated every one-fourth full rotation. At the time of X when the most new data T(M) ① is obtained, the acceleration is calculated from the data T(M) ① and the prior data T(M−1)①. Similarly, the acceleration is calculated from the period data T(M) ② and T (M−1) ② at the time of Y. At the time of Z, the acceleration is calculated similarly. The expression for the calculation is given by $$\text{the angular acceleration} \propto -[T(M)\;①-T(M-1)①]$$

In the fifth embodiment, the acceleration is calculated at the time of only X during one real rotation. In the seventh embodiment, the aforementioned calculation is performed when each signal representing the number of rotations is obtained and the determination is conducted at the basis of the calculated result.

In FIG. 9, four acceleration data in total are computed at the time of X, Y, Z and the like during one real rotation and the determination is conducted at each of the timing points. Thus, the information with respect to the angular acceleration is obtained in detail and the result is that a quick and precise response is obtained using the information.

Many widely embodiments of the present invention may be constructed without departing from the spirit and the scope of the present invention is not limited to the specific embodiments described in the specification, except as defined in the appended claims.

What is claimed is:

1. A servo device for servo controlling a spindle motor, comprising:

means for generating a signal with at least two cycles during one full rotation of a rotator in said spindle motor in accordance with a rotational movement of said rotator;

means for measuring a period for at least one cycle in one full rotation of said rotator;

means for storing at least one target period corresponding to said measured period for said at least one cycle in one rotation of said rotator;

means for comparing said respective measured period with said corresponding target period stored in said storing means; and speed controlling-means for controlling a rotational speed of said rotator in response to a result of said comparing means.

2. A serve device according to claim 1, further comprising:

judging means for judging from said measured periods whether said rotational speed of said rotator is one state or another state, said one state being that said rotational speed is out of a predetermined range and said another state being that said rotational speed is in a predetermined range;

wherein said target periods are updated to said measured periods so as to compensate an angular error associated with a magnetization of said rotator when a result judged by said judging means changes from said one state to said another state.

3. A servo device for servo controlling a spindle motor, comprising:

means for generating a signal with at least two cycles during one full rotation of a rotator in said spindle motor in accordance with a rotational movement of said rotator;

means for measuring a period for each of said cycles in one full rotation of said rotator;

means for computing a period for one full rotation of said rotator from said plural measured periods for each of said cycle;

means for storing a target period corresponding to each of said measured periods for said cycle in one rotation of said rotator;

comparing means for comparing said computed period for one full rotation of said rotator with a target period required for one full rotation of said rotator computed from said periods;

judging means for judging from a result of said comparing means whether said rotational speed of said rotator is one state or another state, said one state being that said rotational speed is out of a predetermined range and said another state being that said rotational speed is in said predetermined range; and speed controlling means for controlling said rotational speed of said rotator in response to a result of said comparing means.

4. A servo device according to claim 3, wherein said plural measured periods are substituted for said target periods respectively so as to compensate an angular error associated with a magnetization of said rotator when a result judged by said judging means changes from said one state to said another state.

5. A servo device according to claim 2, wherein said device further comprises range changing means for changing said predetermined range of the rotational speed of said rotator used for the judgment conducted by said judging means.

6. A servo device according to claim 5, wherein a value equal to or more than a target rotational speed of said rotator associated with said target periods is set as an initial value for said predetermined range.

7. A servo device for servo controlling a spindle motor, comprising:

means for generating a signal with at least two cycles during one full rotation of a rotator in said spindle motor in accordance with a rotational movement of said rotator;

means for measuring a period for each of said cycles;

means for storing at least two target periods corresponding to the measured period, or measured periods respectively;

means for computing a period required for one full rotation of said rotator from the plural measured periods;

first judging means for judging whether the rotational speed of said rotator computed from the computed time required for one full rotation of said rotator is in the predetermined range or not;

means for computing a rotational angular acceleration from the computed time required for one full rotation;

second judging means for judging whether a rotational state of said rotator is stable or not from the computed rotational angular acceleration; and speed controlling means for controlling a rotational speed of said rotator at the basis of the plural measured periods and said target periods.

8. A servo device according to claim 7, wherein the plural measured periods being substituted for said target periods respectively when the result of the judgment conducted by said first judging means is the rotational speed is in the predetermined range anal the result of the judgment conducted by said second judging means changes from a rotational state of said rotator is not stable to a rotational state of said rotator is stable.

9. A servo device according to claim 8, wherein said device further comprises range changing means for changing said predetermined range of the rotational speed of said rotator used for the judgment conducted by said first judging means.

10. A servo device according to claim 9, wherein a value equal to or more than a target rotational speed of said rotator associated with said target periods is set as an initial value for said predetermined range.

11. A servo device for servo controlling a spindle motor, comprising:

means for generating a signal with at least two cycles during one full rotation of a rotator in said spindle motor in accordance with a rotational movement of said rotator;

means for measuring a period for each of said cycles;

means for storing at least two target periods corresponding to the measured periods, or measured periods respectively;

means for computing a rotational angular acceleration from the plural measured periods;

judging means for judging whether a rotational speed of said rotator computed from the rotational angular acceleration is in a predetermined range or not; and speed controlling means for controlling a rotational speed of said rotator in response to a result of said judging means 12. A servo according to claim 7, wherein said computing means are adapted to compute the rotational angular acceleration at the basis of at least two measured periods at different rotations with each other.

13. A servo device according to claim 11, wherein the plural measured periods being substituted for said target periods respectively when the result of the judgement conducted by said judging means changes from a rotational state of said rotator is not stable to a rotational state of said rotator is stable.

14. A servo device according to claim 13, wherein said device further comprises range changing means for changing said predetermined range of the rotational angular acceleration of said rotator used for the judgment conducted by said judging means.

15. A servo device according to claim 4, wherein said device further comprises range changing means for changing said predetermined range of the rotational speed of said rotator used for the judgment conducted by said judging means.

16. A servo according to claim 11, wherein said computing means are adapted to compute the rotational angular acceleration at the basis of at least two measured periods at different rotations with each other.

* * * * *